(12) United States Patent
van Klooster et al.

(10) Patent No.: US 9,989,389 B2
(45) Date of Patent: Jun. 5, 2018

(54) ULTRASONIC TRANSDUCER

(71) Applicant: Krohne AG, Basel (CH)

(72) Inventors: Jeroen Martin van Klooster, Tiel (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 28 days.

(21) Appl. No.: 15/412,358

(22) Filed: Jan. 23, 2017

(65) Prior Publication Data

US 2017/0211957 A1 Jul. 27, 2017

(30) Foreign Application Priority Data

Jan. 22, 2016 (DE) .................. 10 2016 101 154

(51) Int. Cl.
*G01F 1/66* (2006.01)

(52) U.S. Cl.
CPC .............. *G01F 1/667* (2013.01); *G01F 1/662* (2013.01)

(58) Field of Classification Search
CPC ........................................................ G01F 1/66
See application file for complete search history.

(56) References Cited

U.S. PATENT DOCUMENTS

| | | | |
|---|---|---|---|
| 3,925,692 A | 12/1975 | Leschek et al. | |
| 4,297,607 A | 10/1981 | Lynnworth et al. | |
| 4,316,115 A | 2/1982 | Wilson et al. | |
| 4,398,424 A * | 8/1983 | Abts ...................... | G01N 29/24 73/61.75 |
| 6,685,657 B2 | 2/2004 | Jones | |
| 7,628,081 B1 | 12/2009 | Feller | |
| 8,181,533 B2 | 5/2012 | Allen et al. | |
| 8,424,392 B2 | 4/2013 | Kroemer et al. | |
| 8,443,664 B2 * | 5/2013 | Ludwig .................. | B60T 11/26 335/205 |
| 8,904,881 B2 | 12/2014 | Sonnenberg et al. | |
| 9,200,946 B2 | 12/2015 | Ueberschlag et al. | |
| 9,506,789 B2 * | 11/2016 | Gottlieb .................. | G01F 1/667 |
| 2012/0125121 A1 * | 5/2012 | Gottlieb .................. | G01F 1/662 73/861.28 |

FOREIGN PATENT DOCUMENTS

| | | |
|---|---|---|
| WO | 2013/037616 A1 | 3/2013 |
| WO | 2015/198386 A1 | 12/2015 |

* cited by examiner

*Primary Examiner* — Jewel V Dowtin
(74) *Attorney, Agent, or Firm* — David S. Safran

(57) ABSTRACT

An ultrasonic transducer for mounting in an ultrasonic flowmeter for measuring the flow has an electromechanical transducer element for generating ultrasonic signals, a carrier and a housing, the electromechanical transducer element being arranged in the carrier, the housing being formed at least in part of an electroconductive material, the carrier having a carrier material with an acoustic impedance value that lies between the acoustic impedance value of the electromechanical transducer element and the acoustic impedance value of the flowing medium to be measured. To provide an ultrasonic transducer that transmits a high signal portion of the ultrasonic signal into the medium to be measured and simultaneously provides a high operational reliability while being easy to build, the carrier is electroconductive, the carrier and the housing are electroconductively connected to one another and the electromechanical transducer element and the carrier are electroconductively connected to one another.

11 Claims, 1 Drawing Sheet

ULTRASONIC TRANSDUCER

BACKGROUND OF THE INVENTION

Field of the Invention

The invention relates to an ultrasonic transducer for mounting in an ultrasonic flowmeter for measuring the flow of a flowing medium, comprising an electromechanical transducer element for generating ultrasonic signals, a carrier and a housing, wherein the electromechanical transducer element is arranged in the carrier, wherein the housing consists at least in part of an electroconductive material, wherein the carrier has a carrier material with an acoustic impedance and wherein the acoustic impedance value of the carrier material lies between the acoustic impedance value of the electromechanical transducer element and the acoustic impedance value of the flowing medium to be measured.

Description of Related Art

The measurement of flow velocities of different media using ultrasonic flowmeters is known from the prior art.

One measuring principle that forms the basis of this measurement is the running time difference method. That the velocity of propagation of an ultrasonic signal in flowing medium is superimposed on the flow velocity of the medium to be measured is thereby exploited. Thus, the running time of a signal is dependent on whether the signal passes through the medium in the direction of flow or opposite thereto. Signals that are transmitted in the direction of flow are transmitted faster than signals that cover the same path in a direction opposite the flow.

In order to determine the flow velocity, an ultrasonic signal is generated by means of an ultrasonic transducer, in particular by means of an electromechanical transducer element, the signal being fed into the flowing medium and, after passing through the flowing medium, being detected by a receiving sensor. In practice, piezo elements are used particularly often as electromechanical transducer elements. The measured running time of the ultrasonic signal is compared to the running time of a signal that covers the same path, but in the opposite direction. The flow velocity of the flowing medium as well as the the volume flow, if the tube diameter is known, can be determined from the running time difference of the two ultrasonic signals.

The quality of the transmission of the ultrasonic signals generated by the electromechanical transducer element into the flowing medium is, in particular, dependent on the materials arranged between the electromechanical transducer element and the medium and their transmission properties in respect to the transmission of ultrasonic signals. In the scope of the present invention, the carrier is arranged between the electromechanical transducer element and the medium to be measured. Transmission of the ultrasonic signals into the medium to be measured is, in particular, dependent on the acoustic impedance of the carrier material or, respectively, on the impedance difference between the acoustic impedance of the electromechanical transducer element and the acoustic impedance of the carrier material or, respectively, the acoustic impedance of the of the carrier material and the impedance of the flowing medium. If a carrier material having a high impedance deviation in view of the acoustic impedance value of the medium and the electromechanical transducer element is arranged between the electromechanical transducer element and the medium, then the transmission into the medium is low. This is based on the ultrasonic signal being largely reflected at the boundary surface of materials with a high impedance difference and only a small portion of the signal being transmitted. It is, thus, known from the prior art to provide a carrier material with a low impedance, for example a polymer, between the electromechanical transducer element and the flowing medium. The carrier having an impedance adapted to the carrier material and being arranged between the electromechanical transducer element and the medium is called an acoustic window.

An ultrasonic transducer for an ultrasonic flowmeter is known from the International Patent Application Publication WO 2013/037616, which has an electromechanical transducer element in an electrically non-conductive housing having an acoustic window, for example of a polymer, wherein an electrically conductive adapting layer for the acoustic coupling of the transducer element with the acoustic window of the housing is provided between the electromechanical transducer element and the acoustic window of the housing. The adapting layer is connected to a signal or ground line. The electromechanical transducer element is grounded via the adapting layer by the connection to a ground potential.

SUMMARY OF THE INVENTION

In view of the foregoing, a primary object of the present invention is to provide an ultrasonic transducer that guarantees the transmission of a particularly high signal portion of the ultrasonic signal into the medium to be measured and that simultaneously provides a high operation reliability while being particularly easy to build.

The above derived and described object is achieved in that the carrier is at least partially electroconductive, that the carrier and the housing are electroconductively connected to one another and that the electromechanical transducer element and the carrier are electroconductively connected to one another.

It has been seen that it is possible to provide a reliable ultrasonic transducer having a particularly simple construction due to the design of the carrier according to the invention in that it, on the one hand, has an impedance adapted to the surroundings and it is additionally electroconductive, so that additional, conductive connecting elements, for example between the housing and the electromechanical transducer element, can be omitted.

Preferably, the housing is designed so that, in the mounted state in a flowmeter, it is electroconductively connected to the ground potential of the flowmeter. Consequently, the electromechanical transducer element is grounded via the carrier and the housing in a particularly simple manner, wherein additional elements for grounding can be omitted, in particular an additional ground line is not required.

According to a first design, the The ultrasonic transducer according to the invention is a miniaturized ultrasonic transducer. The outlined problems in respect to the transmission of the generated ultrasonic signals into the medium to be measured as well as to providing a high reliability result from the small dimensions, in particular in miniaturized ultrasonic transducers.

The electroconductive material of the housing is preferably a metal or a metal alloy.

According to a further design of the The ultrasonic transducer according to the invention the electromechanical transducer element is electroconductively directly connected to the carrier at least in sections. Thereby, a direct connection is understood in that there are no further connecting elements provided between the transducer element and the carrier. A reliable ultrasonic transducer is provided in a particularly simple manner according to this design.

It is of particular advantage when the carrier material is at least partially formed of a conductive polymer, in particular of conductive polyether ether ketone (PEEK). The design of the carrier material being of a polymer has the advantage that, due to the low acoustic impedance of the polymer, a particularly high transmission of the ultrasonic signals into the flowing medium can be guaranteed. Furthermore, a carrier formed of a polymer has a chemical resistance, also for applications in which the use of metal, for example, is not possible as carrier material. At the same time, the conductivity of the conductive polymers can be exploited in an advantageous manner in order to guarantee the reliability of the ultrasonic transducer. Alternatively, the carrier material can be a conductive ceramic material. If the housing of the ultrasonic transducer has ground potential, then a particularly simple grounding of the transducer element is simultaneously provided.

It is also preferred that the carrier material consists at least partially of a polymer reinforced with carbon fibers, in particular of PEEK reinforced with carbon fibers. The above described advantages also hold true for such a design of the The ultrasonic transducer according to the invention. Furthermore, this design has the additional advantage that the reinforcement of the polymer with carbon fibers increases the stability of the carrier.

According to a further design, the carrier has a conductive layer, wherein the carrier material is coated on the inside of the carrier at least partially with the conducive layer. The inside of the carrier is, thereby, the side facing the electromechanical transducer element. In order to reduce the influence of the conductive layer on the transmission of the ultrasonic signal trough the carrier, the thickness of the conductive layer is preferably, in sections, less than the wavelength of the ultrasonic signal generated by the electromechanical transducer element. This thin application of the conductive layer simultaneously guarantees that the layer is elastic enough to not break during deformation of the carrier, as e.g., when generating ultrasonic signals. It is particularly preferred that the thickness of the conductive layer remains constant. However, it is also advantageous when the thickness of the conductive layer varies in sections. According to one design, the thickness of the conductive layer in the area of the acoustic window is particularly thin, preferably less than the wavelength of the generated ultrasonic signals. Then, the influence on the transmission of the ultrasonic signal is particularly low.

If the carrier material is provided at least partially with a conductive layer, then the carrier material itself does not need to be conductive. Preferably, the carrier material in this case is a non-conductive polymer or a non-conductive ceramic material. By coating it with a conductive layer, the carrier is then overall conductive. Furthermore, it is also preferred that a conductive carrier material is coated at least partially with a conductive layer. This further increases the conductivity of the carrier without substantially influencing the transmission of the ultrasonic signals through the carrier.

It is particularly preferred that the conductive layer is a metallic layer. It is also preferred that the conductive layer is applied using evaporation deposition.

According to a further design, the carrier is electroconductively connected to the housing via the conductive layer.

According to another advantageous design of the The ultrasonic transducer according to the invention, a discharging resistance, an electrode stamp, a signal line and at least one marginally conductive connecting element are provided, wherein the electromechanical transducer element is electrically connected to the signal line via the electrode stamp and wherein the discharging resistance is implemented in that the electrode stamp and/or the electromechanical transducer element is/are electroconductively connected to the carrier via the at least one marginally conductive connecting element. Such a marginally conductive connecting element is, for example, provided in that originally isolating elements, which isolate the electrode stamp and/or the transducer element from the carrier, have a low conductivity. In this case, the use of further elements implementing the discharging resistance can be omitted. It is of particular advantage when the at least one marginally conductive connecting element is implemented by a marginally conductive layer and/or a marginally conductive O-ring. By providing a discharging resistance, the reduction of unwanted voltages in the electromechanical transducer element is guaranteed, which, for example, arise due to temperature fluctuations. Thus, the level of the discharging resistance should be preferably chosen as to not influence the functionality of the electromechanical transducer element, e.g., during control.

Preferably, the at least one marginally conductive connecting element is formed of a marginally conductive polymer.

In detail, there is a plurality of possibilities for designing and further developing the The ultrasonic transducer according to the invention as will become apparent from the following description of preferred embodiments in conjunction with the accompanying drawings.

DETAILED DESCRIPTION OF THE INVENTION

In the figures, the same reference numbers are used for same elements.

Figure 1:
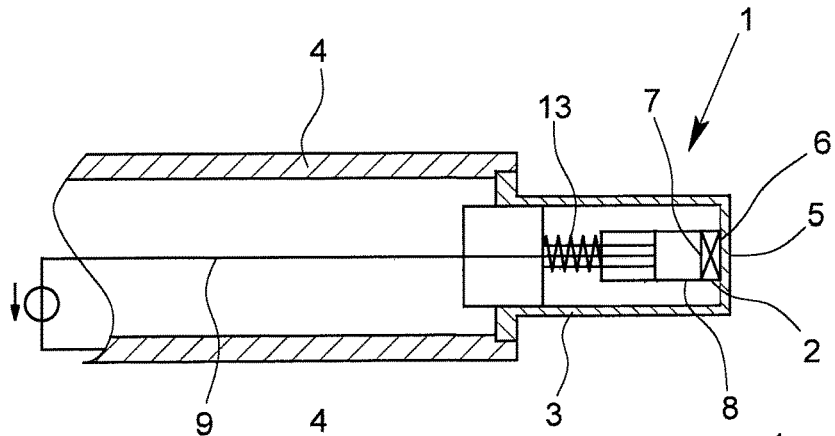
FIG. 1 is a sectional view of a first embodiment of an ultrasonic transducer.

FIG. 1 shows a first embodiment of an ultrasonic transducer 1 for mounting in an ultrasonic flowmeter for measuring the flow of a flowing medium. The ultrasonic transducer 1 has an electromechanical transducer element 2, which is arranged in a carrier 3, and a housing 4, wherein both the carrier 3 and the housing 4 are electroconductive. Preferably, the carrier 3 is formed of an electroconductive polymer. The housing 4 is made of metal. Additionally, the carrier 3 and the housing 4 are electroconductively connected to one another.

The electromechanical transducer element 2 is in direct contact with the carrier 3 via a first surface 6, i.e., without the use of further/intervening connecting elements. Additionally, the electromechanical transducer element is connected to an electrode stamp 8 via a second surface 7, and the electrode stamp is connected to a signal line 9. In order to generate ultrasonic signals, a voltage is applied to the electromechanical transducer element 2 via the signal line 9 and the housing 4 or the carrier 3, is converted into an ultrasonic signal by the transducer element 2. Additionally, the electromechanical transducer element 2 is pre-stressed against the carrier 3 by means of a spring element 13.

Furthermore, the housing 4 is designed such that, in the mounted state in a flowmeter, it creates a conductive connection to the ground potential of the flowmeter. In the mounted state, the electromechanical transducer element 2 is grounded in a particularly simple manner via the carrier 3.

During operation, the carrier 3 is at least partially in contact with the flowing medium to be measured, not shown. Thereby, the transmission of the ultrasonic signal generated by the electromechanical transducer element 2 into the flowing medium takes place via an acoustic window 5, which is arranged in the front area of the carrier 3. In order to guarantee the transmission of a particularly large signal portion into the flowing medium, the carrier 3 is made of a carrier material whose acoustic impedance value lies between the acoustic impedance value of the electromechanical transducer element 2 and the acoustic impedance value of the flowing medium.

In the illustrated embodiment, the carrier 3 formed of a conductive polymer. Thus, by means of the shown ultrasonic transducer 1, on the one hand, a low-loss transmission of the ultrasonic signal generated by the electromechanical transducer element 2 into the flowing medium is guaranteed due to impedance matching to the material surrounding the carrier 3, on the other hand, the electromechanical transducer element 2 is grounded in a particularly simple manner via the carrier 3 and the housing 4, whereby a high reliability is guaranteed.

Figure 2:
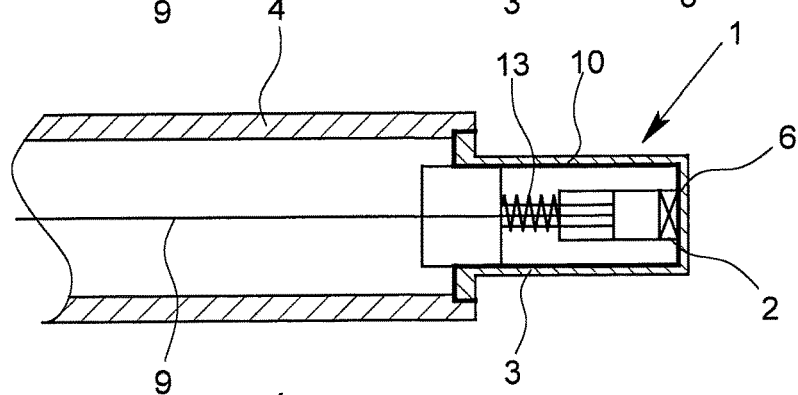
FIG. 2 is a sectional view of a second embodiment of an ultrasonic transducer.

FIG. 2 shows a second embodiment of an ultrasonic transducer 1. The ultrasonic transducer 1 shown here has an electromechanical transducer element 2, which is arranged in a carrier 3, and a housing 4, wherein the carrier 3 consists of a carrier material, whose acoustic impedance value lies between the acoustic impedance value of the electromechanical transducer element 2 and the acoustic impedance value of the flowing medium to be measured. The housing 4 is of metal and is designed such that, in the mounted state in a flowmeter, it has the ground potential for the transducer element 2.

As opposed to the ultrasonic transducer 1 shown in FIG. 1, the carrier material made of a non-conductive polymer, whereby a particularly high transmission of the ultrasonic signal generated by the electromechanical transducer element 2 into the flowing medium is guaranteed. On the inside, i.e., the side of the carrier 3 facing the electromechanical transducer element 2, the carrier material is coated with a conductive, metal layer 10. The carrier 3 is electroconductively connected to the housing 4 via this conductive layer 10. The thickness of the conductive layer 10 is thereby less than the wavelength of the ultrasonic signal generated by the electromechanical transducer element 2, so that, on the one hand, it is guaranteed that an influence of the coating on the transmission of the ultrasonic signals through the carrier 3 is essentially avoided. On the other hand, by coating with such a thin layer, it is guaranteed that the layer has a sufficiently high elasticity to remain intact during deformation of the carrier 3, for example, when generating ultrasonic signals.

The electromechanical transducer element 2 is in direct contact to the carrier 3, in particular to the layer 10 of the carrier 3, via a first surface 6. In the mounted state, the electromechanical transducer element 2 is grounded via the carrier 3 and the housing 4, due to the contact with the carrier 3. Insofar as this embodiment also provides an ultrasonic transducer 1, which is grounded in a particularly simple manner, and at the same time, guarantees the transmission of a particularly large signal portion of the ultrasonic signals.

Figure 3:
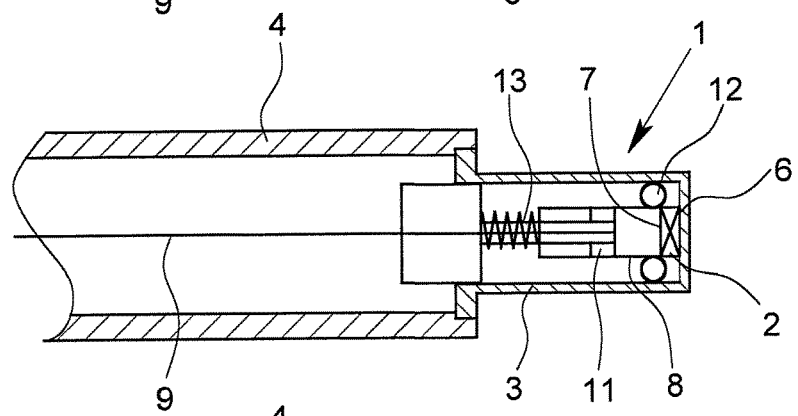
FIG. 3 is a sectional view of a third embodiment of an ultrasonic transducer.

FIG. 3 shows a third embodiment of an ultrasonic transducer 1, wherein the ultrasonic transducer 1 has an electromechanical transducer element 2, which is arranged in a carrier 3, and a housing 4, wherein the carrier 3 is formed of a carrier material whose acoustic impedance value lies between the acoustic impedance value of the electromechanical transducer element 2 and the acoustic impedance value of the flowing medium. Both the carrier 3 and the housing 4 are electroconductive. Preferably, the carrier 3 made of an electroconductive polymer and the housing 4 is made of metal. Additionally, the carrier 3 and the housing 4 are electroconductively connected to one another. The electromechanical transducer element 2 is in direct contact to the carrier 3 via a first surface 6. The electromechanical transducer element 2 is pre-stressed against the carrier 3 by means of a spring element 13.

Additionally, the electromechanical transducer element 2 is connected to a signal line 9 via an electrode stamp 8. In order to generate ultrasonic signals, a voltage is applied to the electromechanical transducer element 2 via the signal line 9 and the housing 4 or the carrier 3, which is then converted into an ultrasonic signal by the transducer element 2. In order to avoid a short circuit, the electrode stamp 8 and the second surface 7 of the electromechanical transducer element 2 are separated from the carrier 3 by resistive elements, preferably by the marginally conductive connecting elements 11, 12. The connecting elements 11, 12 are preferably formed by a marginally conductive layer and by a marginally conductive O-ring. The electromechanical transducer element 2 is additionally centrally arranged within the carrier 3 by means of the O-ring.

To reduce the unwanted voltage on the electromechanical transducer element 2, the ultrasonic transducer 1 has a discharging resistance, via which the electromechanical transducer element 2 discharges when no voltage is applied to the transducer element 2. Preferably, the discharging resistance is provided the electrode stamp 8 and the electromechanical transducer element 2 being connected to the carrier 3 via the marginally conductive connecting elements 11, 12. In the context of the present invention, a marginally conductive connection is to be understood as meaning the resistance of the connection is so high that operation of the electromechanical transducer element 2 is not influenced. Preferably, the elements 11, 12 are formed of a marginally conductive polymer.

If, in the mounted state, the housing 4 creates an additional conductive connection to the ground potential of the flowmeter, the electromechanical transducer element 2 is also grounded via the carrier 3 in a particularly simple manner.

In conclusion, FIG. 3 shows an ultrasonic transducer 1, which provides a particularly high reliability, wherein, at the same time, the transmission of a particularly high signal portion of the ultrasonic signal into the medium to be measured is guaranteed.

Figure 4:
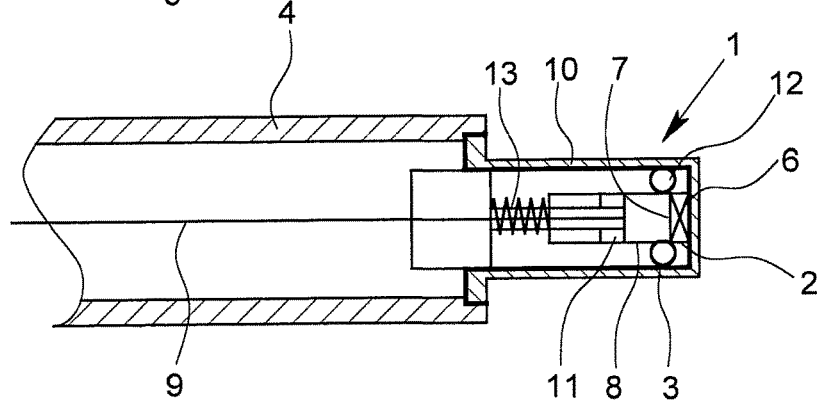
FIG. 4 is a sectional view of a fourth embodiment of an ultrasonic transducer.

FIG. 4 shows a fourth embodiment of an ultrasonic transducer 1, wherein the ultrasonic transducer 1 has an electromechanical transducer element 2, which is arranged in a carrier 3, and a housing 4, wherein the carrier 3 is made of a carrier material whose acoustic impedance value lies between the acoustic impedance value of the electromechanical transducer element 2 and the acoustic impedance value of the flowing medium to be measured and the housing 4 is made of metal.

The carrier material of the carrier 3 is formed of a non-conductive polymer, whereby a particularly high transmission of the ultrasonic signal into the flowing medium is provided. On the inside of the carrier 3, the carrier material is covered with a metallic layer 10. The electromechanical transducer element 2 is electroconductively connected to the carrier 3, in particular to the layer 10, via a first surface 6. Additionally, the carrier 3 is electroconductively connected to the housing 4 via the metallic layer 10.

As described above relative to the third embodiment, the electromechanical transducer element 2 is connected to a signal line 9 via an electrode stamp 3 and the electrode stamp 8 and the side of the electromechanical transducer element 2 connected to the signal line are separated from the carrier 3 in order to avoid a short circuit due to resistive elements, preferably due to the marginally conductive connecting elements 11, 12, which are implemented by a marginally conductive layer and a marginally conductive O-ring.

Furthermore, the ultrasonic transducer 1 also has a discharging resistance, via which the electromechanical transducer element 2 discharges, whereby the development of unwanted voltages due to temperature fluctuations, for example, is avoided. The discharging resistance is also presently provided in that the electrode stamp 8 and the electromechanical transducer element 2 are connected to the carrier 3 via marginally conductive connecting elements 11, 12. Marginally conductive connections are further understood in that the resistance of the marginally conductive connecting elements 11, 12 is large enough to not substantially influence the operation of the transducer element 2. The elements 11, 12 also are made of a marginally conductive polymer.

If, in the mounted state, the housing 4 additionally creates a conductive connection to the ground potential of the flowmeter, then the electromechanical transducer element 2 is additionally grounded in a particularly simple manner via the carrier 3.

In conclusion, this embodiment also provides an ultrasonic transducer 1 that, on the one hand, guarantees a high transmission of the ultrasonic signal into the medium and, on the other hand, allows for a a particularly reliable operation of the ultrasonic transducer 1 by a simple grounding and discharging of unwanted voltages.

What is claimed is:

1. An ultrasonic transducer for mounting in an ultrasonic flowmeter for measuring the flow of a flowing medium, comprising
    an electromechanical transducer element for generating ultrasonic signals,
    a carrier and
    a housing,
    wherein the electromechanical transducer element is arranged in the carrier,
    wherein the housing is formed at least in part of an electroconductive material,
    wherein the carrier is formed a carrier material having an acoustic impedance value that lies between an acoustic impedance value of the electromechanical transducer element and an acoustic impedance value of the flowing medium to be measured,
    wherein the carrier is at least partially electroconductive,
    wherein the carrier and the housing are electroconductively connected to one another, and
    wherein the electromechanical transducer element and the carrier are electroconductively connected to one another.

2. The ultrasonic transducer according to claim 1, wherein the electroconductive material of the housing is a metal or a metal alloy.

3. The ultrasonic transducer according to claim 1, wherein the electromechanical transducer element is electroconductively connected directly, at least in sections, to the carrier.

4. The ultrasonic transducer according to claim 1, wherein the carrier material is at least partially made of a conductive polymer.

5. The ultrasonic transducer according to claim 1, wherein the carrier material is at least partially made of a polymer reinforced with carbon fibers.

6. The ultrasonic transducer according to claim 1, wherein the carrier has a conductive layer and wherein the carrier material is at least partially coated on the inside by the conductive layer.

7. The ultrasonic transducer according to claim 6, wherein the conductive layer has a thickness that is, at least in sections, less than a wavelength of an ultrasonic signal generated by the electromagnetic transducer element.

8. The ultrasonic transducer according to claim 6, wherein the conductive layer is a metallic layer.

9. The ultrasonic transducer according to claim 6, wherein the carrier is electroconductively connected to the housing via the conductive layer.

10. The ultrasonic transducer according to claim 1, wherein a discharging resistance, an electrode stamp, a signal line and at least one marginally conductive connecting element are provided, wherein the electromechanical transducer element is electrically connected to the signal line via the electrode stamp, and wherein the discharging resistance is implemented by at least one of the electrode stamp and the electromagnetic transducer element being electroconductively connected to the carrier via the at least one marginally conductive connecting element.

11. The ultrasonic transducer according to claim 10, wherein the at least one marginally conductive connecting element is at least partially made of a marginally conductive polymer.

* * * * *